Figure 1:
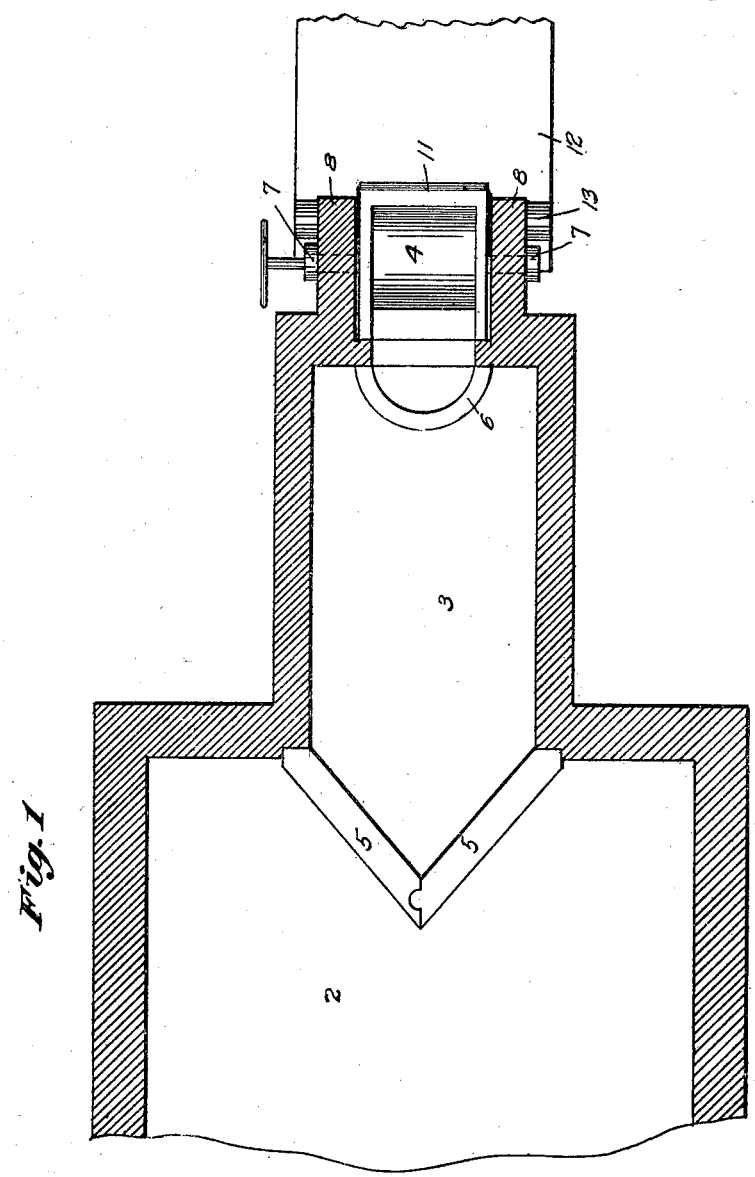

No. 696,738. Patented Apr. 1, 1902.
W. D. KEYES.
APPARATUS FOR REFINING AND DELIVERING GLASS.
(Application filed Aug. 27, 1900.)
(No Model.) 2 Sheets—Sheet 1.

Witnesses
Harry G. Wiseman
Alex D. Mabon

Inventor
W. D. Keyes
By Jno. Nesbit
Attorney

No. 696,738. Patented Apr. 1, 1902.
W. D. KEYES.
APPARATUS FOR REFINING AND DELIVERING GLASS.
(Application filed Aug. 27, 1900.)
(No Model.) 2 Sheets—Sheet 2.
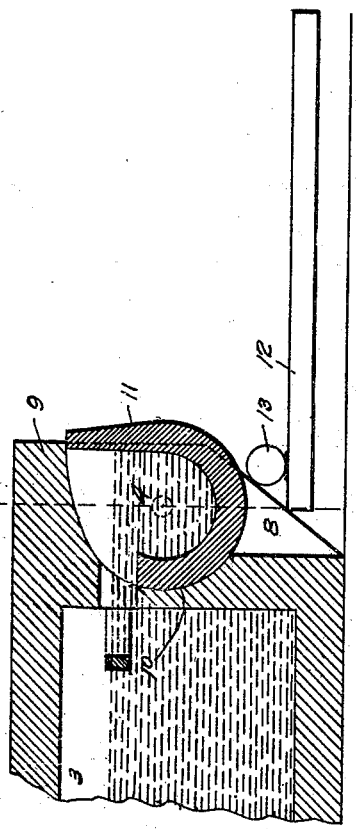
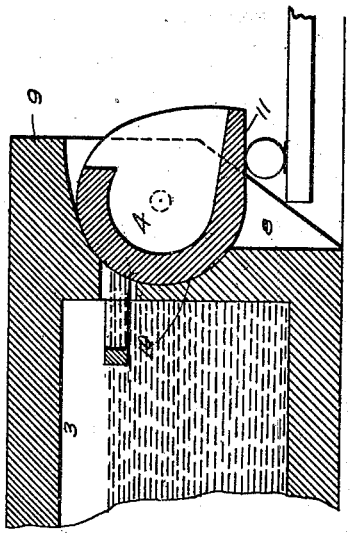
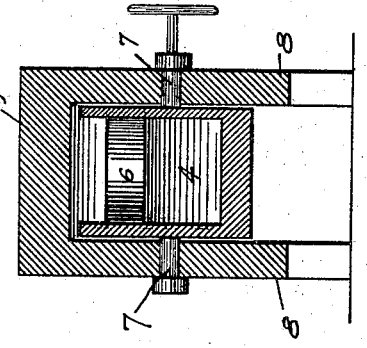
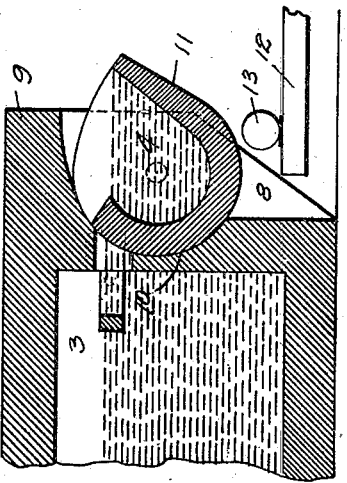
Witnesses
Harry G. Wiseman
Alex. D. Mabon
Inventor
W. D. Keyes
By Jno. Nesbit
Attorney

UNITED STATES PATENT OFFICE.

WASHINGTON D. KEYES, OF KITTANNING, PENNSYLVANIA.

APPARATUS FOR REFINING AND DELIVERING GLASS.

SPECIFICATION forming part of Letters Patent No. 696,738, dated April 1, 1902.

Application filed August 27, 1900. Serial No. 28,137. (No model.)

*To all whom it may concern:*

Be it known that I, WASHINGTON D. KEYES, a citizen of the United States, residing at Kittanning, in the county of Armstrong and State of Pennsylvania, have invented new and useful Improvements in Apparatus for Refining and Delivering Glass, of which the following is a specification.

This invention relates to the manufacture of plate, ribbed, and other cast glass, and has for its primary object to provide improved means for preparing and delivering glass for casting or other working.

For the production of perfect glass it is essential that the molten metal be subjected to the least possible agitation in order to preserve its fiber, which if ruptured produces flaws and imperfections in the finished product. Pots are now universally employed in the manufacture of plate and other similar glass, the batch being melted and refined in and poured from the same pot or melted in a tank from which it is drawn off into pots for fining before being worked. The employment of pots in the preparation of glass even under the most favorable conditions involves more or less agitation thereof. The pouring, upsetting, and jolting of the mass of molten metal incident to charging and emptying the pots and transporting them to and from the refining furnace or oven are unavoidable steps in the process of manufacture as at present practiced and are necessarily productive of disquieting and injurious effects upon the glass.

The aim of the present invention is to obviate these difficulties and at the same time increase the production by providing apparatus wherein the batch is melted, refined, and superrefined by a continuous operation, the body of molten glass remaining as a whole or unseparated into working charges until immediately before being delivered to the casting-table or other place of working. This I accomplish by means of a melting-tank or other refining apparatus having refining and superrefining compartments, said compartments normally communicating to permit the molten glass to evenly distribute therein, and in which the glass is thoroughly settled, fined, and brought to casting condition, the superrefining-compartment being movable for the purpose of separating its contents from that of the refining-compartment and for cooling and discharging the same directly for casting or other working.

The accompanying drawings illustrate an embodiment of my invention, Figure 1 being a sectional plan view of apparatus constructed in accordance therewith. Fig. 2 is a vertical sectional view taken through the axis of the superrefining-compartment. Fig. 3 is a vertical longitudinal sectional view showing the refining and superrefining compartments communicating, as in normal position or relation. Fig. 4 is a similar view illustrating the superrefining-compartment in its intermediate or cooling position, and Fig. 5 is a similar view illustrating said compartment in delivering or discharging position.

The reducing and refining apparatus here shown includes the melting tank or compartment 2, refining-compartment 3, and superrefining and delivering compartment 4, arranged in the order named. Intermediate compartments 2 and 3 are the usual floats 5, and intermediate compartments 3 and 4 is float 6. Compartment 4 is movable with relation to compartment 3, having side trunnions 7 bearing in projecting walls or brackets 8, the latter being united by top wall 9. With compartment 4 in normal position (shown in Fig. 3) the outer air is excluded, and at the top and rear it has uninterrupted communication with compartment 3, so that the glass occupies both compartments in an uninterrupted and unbroken mass and at a uniform level. The glass receives its initial refining in compartment 3 and is skimmed by float 6 before passing into compartment 4, wherein it is superrefined and finally settled. It will be understood that the heat and other fining influences are continuous throughout both compartments, though the temperature in superrefining-compartment 4 is somewhat lower than in compartment 3, which starts a gradual and not too sudden cooling of the glass preparatory to casting.

The rear and bottom portions of compartment 4 are curved concentrically with trunnions 7, and the face of compartment 3, between walls 8, is formed with a seat 10, curved concentrically with the curved portions of the compartment 4 and in which the latter snugly fits and turns. The front of compartment 4 is straight from its top downward, as indicated at 11, and its upper end closes normally against wall 9 and excludes air from the fining-compartments.

When it is desired to make a cast, compartment 4 is moved from position shown in Fig. 3 to that shown in Fig. 4, the rear portion of the moving compartment separating the glass in the two compartments and at the same time closing the refining-compartment 3, so that when the contents of compartment 4 are exposed to the outer air for attaining a proper casting temperature no air can pass to compartment 3. With the glass at proper temperature compartment 4 is turned to position shown in Fig. 5, which delivers the glass onto casting-table 12 and in front of roller 13. The table is arranged as close to the compartment 4 as possible, so that the delivery will be accomplished with comparatively little drop, thereby avoiding excessive motion or agitation of the glass. This desired quiet discharge is materially assisted by the straight front wall 11, over which the glass passes to the table.

Referring to the shape of compartment 4, it will be observed that with the exception of front wall 11 its interior contour is concentric with the compartment-axis, so that the turning of the compartment from position shown in Fig. 3 to that shown in Fig. 4 and from Fig. 4 to that illustrated in Fig. 5 causes the least possible disturbance to the body of glass within the compartment. The motion being a concentric one, the compartment, in effect, moves circularly around the contained mass of molten glass without setting the same in motion, save as it moves forward on straight wall 11 and finally discharges thereover. After the glass has been discharged onto the casting-table compartment 4 is restored to normal position, Fig. 3, and communication with compartment 3 is restored. Immediately the glass moves into or fills compartment 4, assuming a common level in both compartments, and the process of superrefining and conditioning the glass for casting is repeated. The molten glass forms an automatic seal between the fixed and moving walls of compartments 3 and 4, thereby excluding air and preventing discharge of molten glass.

With my improved apparatus the operation of preparing and delivering highly-refined glass is far more rapid, direct, and economical than the methods heretofore practiced, the output is greatly increased, and the expense of providing and maintaining pots and a refining furnace or oven is avoided.

Having thus fully described my invention, what I claim as new, and desire to secure by Letters Patent, is—

1. A glass-furnace having a refining-compartment the end wall of which is formed with a seat, and a superrefining-compartment mounted to turn on a horizontal axis in said seat and normally in communication with the refining-compartment and forming a continuation thereof, the superrefining-compartment being adapted to be turned to break said communication and discharge its contents, substantially as shown and described.

2. A glass-furnace having a refining-compartment the end wall of which is formed with a seat, and a superrefining-compartment mounted to turn on a horizontal axis in said seat and normally in communication with the refining-compartment and forming a continuation thereof, the rear wall of the superrefining-compartment serving, when the same is oscillated, to sever the glass therein from that contained in the refining-compartment and to close the latter and to discharge its own contents directly for working substantially as shown and described.

3. A glass-furnace having a refining-compartment the end wall of which is formed with a seat, and a superrefining-compartment mounted to turn on a horizontal axis in said seat and normally in communication therewith and forming a continuation thereof, the front wall of the movable compartment being higher than the rear wall and adapted normally to close against the roof of said seat and exclude the outer air, the movable compartment when oscillated being adapted to close the refining-compartment and discharge its own contents, substantially as shown and described.

In testimony whereof I have hereunto set my hand in presence of two subscribing witnesses.

WASHINGTON D. KEYES.

Witnesses:
ALEX. S. MABON,
J. M. NESBIT.